(12) United States Patent
Lukic

(10) Patent No.: US 10,895,472 B2
(45) Date of Patent: Jan. 19, 2021

(54) METHOD FOR CHECKING A ROTATING LASER FOR CONE ERRORS

(71) Applicant: Hilti Aktiengesellschaft, Schaan (LI)

(72) Inventor: Sasha Lukic, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 317 days.

(21) Appl. No.: 15/778,583

(22) PCT Filed: Nov. 23, 2016

(86) PCT No.: PCT/EP2016/078489
§ 371 (c)(1),
(2) Date: May 23, 2018

(87) PCT Pub. No.: WO2017/093088
PCT Pub. Date: Jun. 8, 2017

(65) Prior Publication Data
US 2018/0335316 A1 Nov. 22, 2018

(30) Foreign Application Priority Data
Nov. 30, 2015 (EP) .................................... 15197022

(51) Int. Cl.
*G01C 25/00* (2006.01)
*G01C 15/00* (2006.01)

(52) U.S. Cl.
CPC .......... *G01C 25/00* (2013.01); *G01C 15/004* (2013.01)

(58) Field of Classification Search
None
See application file for complete search history.

(56) References Cited

U.S. PATENT DOCUMENTS

| 7,200,945 B2* | 4/2007 | Endo | G01C 15/002 33/290 |
| 2014/0283399 A1* | 9/2014 | Fessler | G01C 15/004 33/291 |
| 2014/0304994 A1* | 10/2014 | Dumoulin | G02B 27/648 33/228 |

FOREIGN PATENT DOCUMENTS

| DE | 197 16 710 A1 | 11/1997 |
| EP | 1 203 930 B1 | 5/2002 |
| EP | 2 833 159 A1 | 2/2015 |

OTHER PUBLICATIONS

PCT/EP2016/078489, International Search Report (PCT/ISA/220 and PCT/ISA/210) dated Jan. 23, 2017, with partial English translation, enclosing Written Opinion of the International Searching Authority (PCT/ISA/237) (Fourteen (14) pages).

(Continued)

*Primary Examiner* — Daniel S Larkin
(74) *Attorney, Agent, or Firm* — Crowell & Moring LLP

(57) ABSTRACT

A method for checking a rotating laser for cone errors using a laser receiver, where the rotating laser projects a laser beam which can rotate in a horizontal plane about an axis of rotation and the horizontal plane spans from a first horizontal axis to a second horizontal axis. The rotating laser is arranged in a horizontal position at a first location and at a second location between a first measurement surface and a second measurement surface. The rotating laser having, at the first location a first measurement distance, and having, at the second location a second measurement distance, to the second measurement surface.

13 Claims, 10 Drawing Sheets

(56) References Cited

OTHER PUBLICATIONS

"UL300 Bedienungsanleitung", TRIAX, Oct. 1, 2004, XP055269227, URL: http://www.glm-laser.com/glm/files/ul300_bedienungsanleitung.pdf, 32 total pages.

U.S. Patent Application, "Method for Orienting a Device Axis in a Defined State", filed May 23, 2018, Inventor: Sasha Lukic.

U.S. Patent Application, "Method for Measuring an Operating Temperature of Equipment", filed May 23, 2018, Inventor: Sasha Lukic.

U.S. Patent Application. "Method for Checking and/or Calibrating a Horizontal Axis of a Rotating Laser", filed May 23, 2018, Inventor: Sasha Lukic et al.

U.S. Patent Application, "Method for Measuring a Measurement Distance Between a Rotating Laser and a Laser Receiver", filed May 23, 2018, Inventor: Andreas Winter et al.

U.S. Patent Application, "Method for Checking and/or Calibrating a Vertical Axis of a Rotating Laser", filed May 23, 2018, Inventor: Sasha Lukic et al.

* cited by examiner

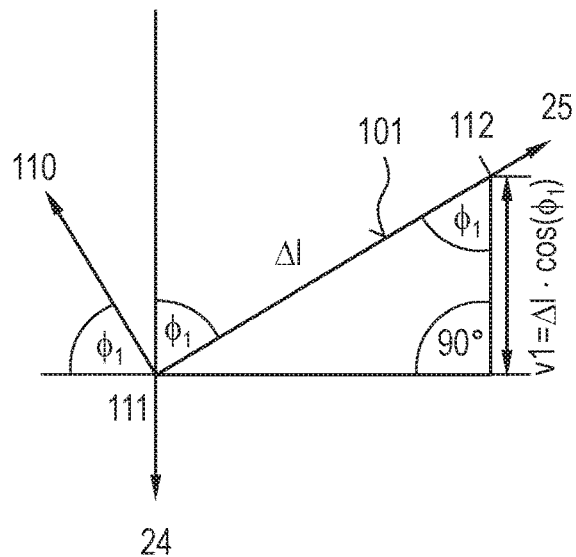
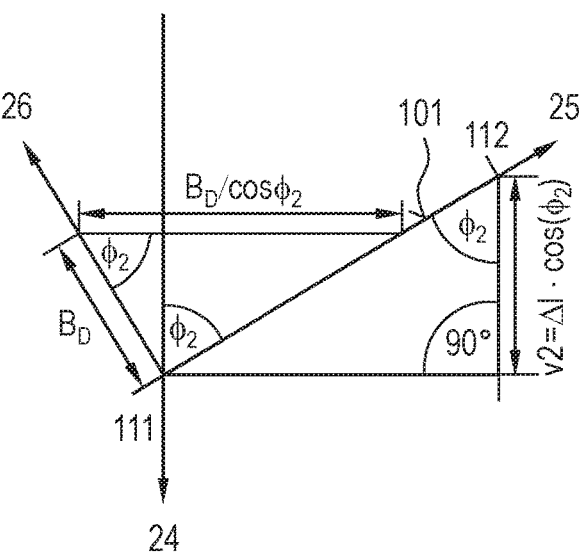
FIG. 6A  FIG. 6B
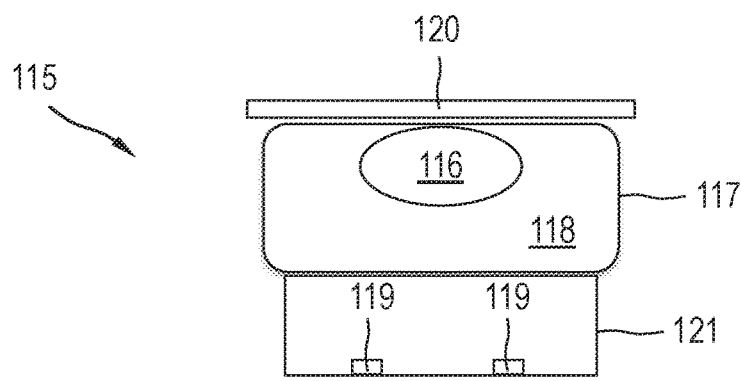
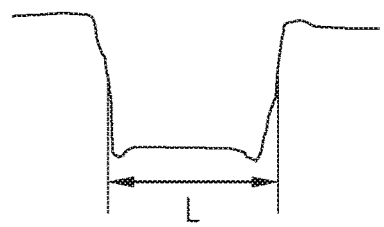
FIG. 7A

METHOD FOR CHECKING A ROTATING LASER FOR CONE ERRORS

CROSS REFERENCE TO RELATED APPLICATIONS

This application claims the priority of International Application No. PCT/EP2016/078489, filed Nov. 23, 2016, European Patent Application No. 15197022.5, filed Nov. 30, 2015, the disclosures of which are expressly incorporated by reference herein.

BACKGROUND AND SUMMARY OF THE INVENTION

The present invention relates to a method for checking a rotating laser for cone errors.

Rotating lasers are used indoors and outdoors for leveling and marking tasks, such as displaying laser markings running horizontally, vertically, or diagonally on a target surface, or determining and checking horizontal heights, perpendicular lines, alignments, and plumb points. Rotating lasers can be arranged in various device positions, which are designed as horizontal positions and vertical positions. One thereby differentiates between horizontally usable rotating lasers, which are solely used in the horizontal position, and horizontally and vertically usable rotating lasers, which are used in the horizontal position and the vertical position. Horizontally usable rotating lasers have as device axes a first horizontal axis and a second horizontal axis, which run perpendicular to each other and span a horizontal plane. Horizontally and vertically usable rotating lasers have as a device axis, in addition to the first and second horizontal axes, a vertical axis that runs perpendicular to the horizontal plane of the first and second horizontal axes.

To ensure the accuracy of a rotating laser when in operation, the accuracy must be checked regularly and if a maximum difference defined by the device manufacturer is exceeded, the rotating laser must be calibrated. The accuracy of the rotating laser is thereby checked for every device axis. Methods are known for checking and/or calibrating a horizontal axis and for checking and/or calibrating a vertical axis. For horizontally usable rotating lasers, the first and second horizontal axes are checked sequentially, wherein the sequence is arbitrary. For horizontally and vertically usable rotating lasers, after the first and second horizontal axes are checked, a check of the vertical axis is performed.

The orientation of the device axes in a defined state occurs by means of a leveling device of the rotating laser. The defined state of the rotating laser in the horizontal position is referred to as the horizontal state and in the vertical position as the vertical state. The leveling device comprises a first leveling unit that orients the first horizontal axis in a first defined state, a second leveling unit that orients the second horizontal axis in a second defined state, and for a vertically usable rotating laser, there is a third leveling unit that orients the vertical axis in a third defined state. Each of the leveling units comprises an inclination sensor that measures the inclination of the device axis, and an adjustment element with which the inclination of the device axis can be adjusted. Ideally, the inclination sensors are oriented parallel to the allocated device axes. If an inclination sensor is not parallel to the allocated device axis, the device axis will have an inclination error.

Besides deviations between the inclination sensors and device axes, additional errors can occur that impair the accuracy of a rotating laser. These include cone errors of the rotating laser, which are caused by an inclination of the deflection lens to the axis of rotation. Most rotating lasers of the prior art are not provided with a method by which operators can check a rotating laser for cone errors. Checking for cone errors for most rotating lasers is done by the device manufacturer as part of a calibration service. The rotating lasers for which a cone error check is done by the operator include the Sokkia TRIAX UL-300 rotating laser and the Topcon RL-100 1S rotating laser. The procedures for checking for cone errors are performed after the horizontal axes are checked and calibrated if applicable. The cone error check occurs in the horizontal position of the rotating laser by means of a rotating laser beam between a first measurement surface and a parallel second measurement surface. The rotating lasers are set up in a first spatial position and a second location at various measurement distances to the second measurement surface.

The sequence of the known methods for checking the TRIAX UL-300 and RL-100 1S for cone errors is identical; the methods differ in the distance between the first and second measurement surface as well as the measurement distances that the rotating lasers have in the first and second locations to the second measurement surface. In regard to the TRIAX UL-300 rotating laser, the first and second measurement surfaces are at a distance of approx. 30 m, and for the RL-100 1S that distance is approx. 50 m. The TRIAX UL-300 rotating laser has in the first location a first measurement distance of approx. 29 in and in the second location a second measurement distance of approx. 1 m to the second measurement surface. The RL-100 1S rotating laser has in the first location a first measurement distance of approx. 25 in and in the second location a second measurement distance of approx. 1 to 2 m to the second measurement surface.

To check a rotating laser for cone errors, the rotating laser is set up in the horizontal position in the first location at a first measurement distance to the second measurement surface. The horizontal axes of the rotating laser are oriented in the first location in a horizontal state, wherein the horizontal state of the first horizontal axis is established by a first zero position and the horizontal state of the second horizontal axis is established by a second zero position. The incident position of the rotating laser beam is marked as a first control point on the first measurement surface. The rotating laser is rotated in the first location by 180° C. about the axis of rotation of the rotating laser and the incident position of the rotating laser beam on the second measurement surface is marked as the second control point. Subsequently, the rotating laser is set up in a horizontal position in the second location at a second measurement distance to the second measurement surface, wherein the orientation of the horizontal axes in relation to the first location is unchanged. In the second location, the horizontal axes of the rotating laser are oriented into the horizontal state. The incident position of the rotating laser beam on the second measurement surface is marked as the third control point. In the second location, the rotating laser is rotated 180° about the axis of rotation of the rotating laser and the incident position of the rotating laser beam on the first measurement surface is marked as a fourth control point. The distance between the first and fourth control points on the first measurement surface is determined as a first difference and the distance between the second and third control points on the second measurement surface is determined as a second difference. The first and second differences are compared against a maximum difference established by the device manufacturer. If the first and/or second difference exceeds the maximum difference, the rotating laser does not meet the accuracy requirements and should be adjusted by the device manufacturer. The maximum difference is 6 mm for the Sokkia TRIAX UL-300 rotating laser and 10 mm for the Topcon RL-100 1S rotating laser.

The known methods for checking a rotating laser for cone errors have the disadvantage that the distance between the first measurement surface and the second measurement surface are predefined. The distance between the first and second measurement surfaces of 30 m established for Sokkia's TRIAX UL-300 rotating laser and in particular the distance of 50 m established for Topcon's RL-100 1S rotating laser frequently do not exist for indoor measuring tasks. In addition, the incident positions of the laser beam are manually transferred to the measurement surfaces Which is unsuitable for automating the procedure. Another disadvantage is that the accuracy of the procedure depends on the care taken by the operator in determining the center point of the laser beam when transferring the center point on to the measurement surface and when determining the distance between the control points.

The object of the present invention consists of developing a method for checking a rotating laser for cone errors, which can be adapted to the ambient conditions of the measuring environment. In addition, the method is to be suitable for a design that is largely automated.

According to the invention, the method for checking a rotating laser for cone errors has the following steps:

The rotating laser is positioned in a first location between a first measurement surface and a second measurement surface, wherein the rotating laser in the first location has a first measurement distance $D1$ to the second measurement surface and is oriented in a measuring direction toward the second measurement surface, The horizontal axes of the rotating laser are oriented in a horizontal state, wherein the horizontal state is established by a first zero position for the first horizontal axis and a second zero position for the second horizontal axis, The incident position of the laser beam on the first measurement surface is determined as the first control point, The incident position of the laser beam on the second measurement surface is determined as a second control point by a detection field of a laser receiver and the distance of the second control point to a zero position of the detection field is stored as first height offset $H1$, The rotating laser is set up in a second location between the first measurement surface and the second measurement surface, wherein the rotating laser in the second location has a second measurement distance $D2$ to the second measurement surface and is oriented in the measurement distance toward the second measurement surface, The rotating laser is arranged at a height at which the incident position of the laser beam on the first measurement surface matches the first control point, The incident position of the laser beam on the second measurement surface is determined as the third control point by the detection field of the laser receiver and the distance of the third control point to the zero position of the detection field is stored as the second height offset $H2$, The distance between the second control point and the third control point is calculated as the difference $\Delta$ from the first and second height offsets, A cone error $\delta$ is calculated from the first measurement distance $D1$, the second measurement distance $D2$ and difference $\Delta$, and The cone error $\delta$ is compared against a maximum error $\delta max$.

In regard to the method according to the invention for checking a rotating laser for cone errors, the measurement distances $D1$, $D2$ between the rotating laser and the laser receiver are measured in the first and second location, and are not established based on specified measurement distances. This has the advantage that the first and second measurement distances $D1$, $D2$ can be adapted to the ambient conditions of the measuring environment. The incident positions of the laser beam on the second measurement surface are determined, in the method according to the invention, using a laser receiver and stored as height offsets $H1$, $H2$ for the zero position of the detection field. By using a laser receiver with a measuring function, the measuring accuracy is increased when executing the procedure. The laser receiver determines the incident position of the laser beam on the detection field according to a fixed routine. This has the advantage that the accuracy of the method is independent of the care taken by the operator and is suited for the automated execution of the method. When the rotating laser is arranged on a tripod with motorized height adjustment and a rotating platform, the method according to the invention can be automatically executed in the first and second locations; the operator must only move the rotating laser from the first location to the second location.

In the first location, the rotating laser is oriented in an arbitrary measurement direction toward the second measurement surface. The first horizontal axis, the second horizontal axis or an arbitrary axis in the horizontal plane can thereby be oriented toward the second measurement surface. It is important that the orientation of the rotating laser in the second location is unchanged in relation to the first location, and that the established measuring direction is oriented toward the second measurement surface. The first control point on the first measurement surface is used to undertake a height adjustment of the rotating laser in the second location. Cone error $\delta$ is calculated from a first measurement distance $D1$, a second measurement distance $D2$ and a difference $\Delta$ between first and second height offsets $H1$, $112$. Cone error $\delta$ can be calculated according to the formula $\tan(\delta)=\frac{1}{2}(H1-H2)/(D1-D2)$. If cone error $\delta$ is greater than maximum error $\delta max$, an adjustment of the rotating laser is required.

In a preferred design, the incident position of the laser beam on the first measurement surface is determined in the first location of an additional laser receiver. The use of another laser receiver has the advantage that the incident position of the laser beam on the first measurement surface can be determined with a high degree of measurement accuracy. In addition, the position of the first measurement surface and the distance to the second measurement surface can be adapted to the respective measuring environment. If the rotating laser and the laser receiver have an auto-alignment function, the method steps of the method according to the invention can be executed in the first and second locations in a fully automated manner. The operator must only move the rotating laser from the first location to the second location.

In a particularly preferred manner, the height adjustment of the rotating laser is controlled in the second location. Since the first and second measurement distances $D1$, $D2$ are arbitrary, the height of the rotating laser must be adjusted in such a manner that deviations are to be attributed to cone error. To do so, the first control point of the laser beam on the first measurement surface is used. The rotating laser is adjusted height-wise in the second location in such a manner that the incident position of the laser beam on the first measurement surfaces coincides with the first control point. If the height adjustment occurs in a controlled manner, the method can be performed in an automated manner. The first control point is stored by the additional laser receiver and is used by means of an auto-alignment function for adjusting the height of the rotating laser. The auto-alignment function is described in European patent EP 1 203 930 B1.

Preferably, the first measurement distance is determined in the first location and/or the second measurement distance is determined in the second location by means of the rotating laser and the laser receiver. The method according to the invention has the advantage that the ambient conditions of the measurement environment can be taken into account when checking the rotating laser for cone error. The first and second measurement distances between the rotating laser and the laser receiver in the first and second locations may be selected as the measurement environment permits.

In a particularly preferred manner, the first and/or second measurement distances between the rotating laser and the laser receiver are determined as the first distance using a first measuring procedure, as a second distance using a second measuring procedure, or as a distance averaged from the first and second distances. If the first and/or second measurement distances between the rotating laser and the laser receiver can be determined using various measuring procedures, the method for checking the rotating laser for cone error can be adapted to the ambient conditions of the measurement environment and the functions of the measuring devices (rotating laser and laser receiver).

In a first preferred design, the first and/or second measurement distance between the rotating laser and the laser receivers is determined as the first distance by means of the first measuring procedure. In the first measuring procedure, the laser beam is inclined at a known inclination angle and the distance of the inclined laser beam to the zero position of the detection field is stored. The first measuring procedure is suitable for laser receivers with a measuring function, which can measure the distance of a laser beam to a zero position. The laser beam can be inclined by an inclination angle by means of the leveling device of the rotating laser. The leveling device comprises a first leveling unit that orients the first horizontal axis in a first defined state and a second leveling unit that orients the second horizontal axis in a second defined state. The rotating laser can be oriented in an arbitrary measuring direction toward the second measurement surface, wherein the first horizontal axis, the second horizontal axis or an arbitrary axis in the horizontal plane can be defined as the measuring direction. If the first or second horizontal axis arc is used as the measuring direction, the rotating laser is arranged for distance measurement in a suitable angular position. The laser beam is thereby inclined by means of the first leveling unit when the first horizontal axis is used as a measuring direction, and by means of the second leveling unit when the second horizontal axis is used as the measuring direction.

In a first variant of the first measuring procedure, the rotating laser is oriented horizontally, the horizontally oriented laser beam is set to the zero position of the detection field, the laser beam is inclined toward the laser receiver by an inclination angle $\alpha$, the incident position of the inclined laser beam on the detection field of the laser receiver is determined as a first measuring point, the distance of the first measuring point to the zero position of the detection field is stored as first height $h1=h(\alpha)$ and first distance $d1$ is calculated from the inclination angle $\alpha$ and a height difference $\Delta h$ between first height $h1$ and the zero position of the detection field. When the longitudinal direction of the laser receiver is oriented parallel to the direction of gravity, first distance $d1$ can be calculated according to the formula $\tan(\alpha)=\Delta h/d1$. For small inclination angles $\alpha$, $\tan(\alpha) \approx \sin(\alpha)$ approximately. The first variant of the first measuring procedure is particularly suited for rotating lasers and laser receivers with an auto-alignment function, in which the height adjustment of the laser beam to the zero position of the detection field of the laser receiver can be performed automatically.

In a second variant of the first measuring procedure, the rotating laser is oriented vertically, the incident position of the vertically oriented laser beam on the detection field of the laser receiver is determined as a reference point, the distance of the reference point to the zero position of the detection field is stored as reference height $h0=h(0°)$, the laser beam is inclined by inclination angle $\alpha$, the incident position of the inclined laser beam on the detection field is determined as a first measuring point, the distance of the first measuring point to the zero position of the detection field is stored as first height $h1=h(\alpha)$ and first distance $d1$ is calculated from the inclination angle $\alpha$ and a height difference $\Delta h$ between first height $h1$ and reference height $h0$. When the longitudinal direction of the laser receiver is oriented parallel to the direction of gravity, first distance $d1$ can be calculated according to the formula $\tan(\alpha)=(h1-h0)/d1=\Delta h/d1$. For small inclination angles $\alpha$, the relationship is approximately $\tan(\alpha)=\sin(\alpha)$. The second variant of the first measuring procedure is suited for rotating lasers and laser receivers without an auto-alignment function. The operator must only ensure that the laser beam inclined at inclination angle $\alpha$ is captured by the detection field of the laser receiver. For a rotating laser and laser receiver with an auto-alignment function, the laser beam is automatically moved to the region of the detection field.

In a third variant of the first measuring procedure, the rotating laser is oriented horizontally, the horizontally oriented laser beam is inclined in an inclination direction by inclination angle $\alpha$, the incident position of the inclined laser beam on the detection field of the laser receiver is determined as the first measuring point, the distance of the first measuring point to the zero position of the detection field is stored as first height $h1=h(\alpha)$, the laser beam is inclined in an opposing inclination direction by a negative inclination angle $-\alpha$, the incident position of the inclined laser beam on the detection field is determined as the second measuring point, the distance of the second measuring point to the zero position of the detection field is stored as second height $h2=h(-\alpha)$ and first distance $d1$ is calculated from the inclination angle $\alpha$ and a height difference $\Delta h$ between height $h1$ and second height $h2$. When the longitudinal direction of the laser receiver is oriented parallel to the direction of gravity, first distance $d1$ can be calculated according to the formula $\tan(2\alpha)=(h(\alpha)-h(-\alpha))/d1=\Delta h/d1$. For small inclination angles $\alpha$, $\tan(2\alpha) \approx \sin(2\alpha)$ approximately. The third variant of the first measuring procedure is suitable for rotating lasers and laser receivers with and without an auto-alignment function. When the horizontally oriented laser beam is initially oriented to the zero position of the detection field or at least in the vicinity of the zero position, the entire detection height of the detection field can be used. For a device system with an auto-alignment function, the adjustment to the zero position can be performed automatically.

In a second preferred embodiment, the first and/or second measurement distance between the rotating laser and the laser receiver is determined as the second distance by means of the second measuring procedure. In the second measuring procedure, the rotating laser is oriented horizontally, the horizontally laser beam is moved at a rotation speed vR about the axis of rotation, the signal length ts of the rotating laser beam on the detection field of the laser receiver is determined and second distance d2 is calculated from the rotation speed vR, signal length ts and detection width BD of the detection field. When the longitudinal direction of the laser receiver is oriented parallel to the direction of gravity, the second distance d2 can be calculated according to the formula ts/tfull=BD/($2\pi$d2), where tfull=60/vR. Rotation speed vR is indicated in revolutions per minute and timefull required for one revolution is 60/vR. The second measuring procedure is suitable for rotating lasers and laser receivers without an auto-alignment function. The laser receiver must be able to measure signal length ts of the laser beam on the detection field.

In a third preferred embodiment, the first and/or second measurement distance between the rotating laser and the laser receiver is determined as the distance averaged from the first and second distances. By averaging the first and second distances, the accuracy with which one can determine the measurement distance between the rotating laser and the laser receiver can be increased. The first distance, which is determined using the first measuring procedure, is greater than or equal to the actual measurement distance. When the longitudinal direction of the laser receiver is not oriented parallel to the direction of gravity but is inclined in relation to the direction of gravity, the vertical distance in the direction of gravity is less than the distance, which the detection field of the laser receiver measured. The second distance, which is determined using the second measuring procedure, is less than or equal to the actual measurement distance. When the transverse direction of the laser receiver is not oriented parallel to the direction of gravity but is inclined in relation to the direction of gravity, the horizontal distance perpendicular to the direction of gravity, which the rotating laser beam passes over on the detection field, is greater than detection width BD of the detection field.

In a preferred development of the method, an inclination of the laser receiver relative to a direction of gravity is determined as a first vertical angle φ1 in a first vertical plane and/or as a second vertical angle φ2 in a second vertical plane, wherein the first vertical plane is spanned by the direction of gravity and a perpendicular vector of the detection field of the laser receiver and the second vertical plane is spanned by a longitudinal direction and a transverse direction of the detection field. First vertical angle φ1 is measured between the perpendicular vector of the detection field and the direction of gravity, wherein first vertical angle φ1 represents the deviation of 90° between the perpendicular vector and the direction of gravity, and second vertical angle φ2 is measured between the direction of gravity and the longitudinal direction of the detection field. In executing the method according to the invention, the laser receiver is oriented in a longitudinal arrangement, wherein the longitudinal direction of the detection field should run parallel to the direction of gravity and the transverse direction of the detection field should run perpendicular to the direction of gravity. By inclining the laser receiver relative to the direction of gravity, the horizontal and vertical distances deviate from the distances that the detection field of the laser receiver measured. If the inclination of the laser receiver is known, the dimensions can be corrected accordingly. The laser receiver may be inclined relative to the direction of gravity by the first vertical angle, the second vertical angle or the first and second vertical angles. The inclination of the laser receiver can be measured by means of a 2-axis acceleration sensor or by means of two 1-axis acceleration sensors.

In a particularly preferred manner, in the evaluation with the laser receiver for the first vertical angle φ1 and/or the second vertical angle φ2, an angle-dependent correction factor $\cos(\varphi_1)$, $\cos(\varphi_2)$, $1/\cos(\varphi_2)$ is multiplied. By the multiplication with an angle-dependent correction factor or with multiple angle dependent correction factors, the inclination of the laser receiver can be compensated by first vertical angle φ1 and/or second vertical angle φ2. In the formulas that use the measuring function of the laser receiver and measure distances on the detection field in the longitudinal direction, the distances are multiplied by a correction factor $\cos(\varphi_1)$ for first vertical angle φ1 and a correction factor $\cos(\varphi_2)$ for second vertical angle φ2. The correction factor $\cos(\varphi_1)^*\cos(\varphi_2)$, is to be taken into account in the distance measurement of the measurement distance using the first measuring procedure, in determining the difference between the second and third control points, and calculating the cone error within the scope of the method according to the invention.

In regard to the distance measurement of the first or second measurement distance as the second distance using the second measuring procedure, one does not use the conventional measuring function of the laser receiver in the longitudinal direction, but one uses the detection width in the transverse direction. By inclining the laser receiver in the second vertical plane by second vertical angle φ2, the horizontal distance that the laser beam passes over in the detection field is greater than detection width BD of the detection field. The signal length of the rotating laser beam corresponds to the horizontal distance on the detection field. For the horizontal distance, the correlation $B_D/\cos(\varphi_2)$ applies. An inclination of the laser receiver by the first vertical angle φ1 does not change the horizontal distance. The angle-dependent correction factor $1/\cos(\varphi_2)$ is taken into account in the distance measurement using the second measuring procedure.

In a preferred development of the method, to orient the first and second horizontal axes in the horizontal state, multiple first and second zero positions are included as a function of a temperature or a temperature-dependent measured value and stored in a first and second characteristic curve. The term "characteristic curve" thereby comprises both a continuous characteristic curve as well as a table with discrete value pairs of zero positions and temperatures, or of zero positions and temperature-dependent measured values. The first characteristic curve produces for the first horizontal axis a relationship between the temperature or temperature-dependent measured value and the first zero position of the first inclination sensor, and the second characteristic curve establishes for the second horizontal axis a relationship between the temperature or the temperature-dependent measured value and the second zero position of the second inclination sensor. Defined as the zero position is the inclination angle, which correspond to the defined state of the horizontal axis. From the characteristic curve, one can read a zero position for every temperature from the approved operating temperature range of the rotating laser.

Preferably, the temperature or the temperature-dependent measured variable of the rotating laser is measured, the zero position associated with the temperature or measured value is determined from the characteristic curve, and the horizontal axis is oriented in the state defined by the zero positions. By means of the temperature measurement, one can increase the accuracy of the rotating laser, since the influence of the temperature on the accuracy of the rotating laser is reduced. The method according to the invention for checking a rotating laser for cone error is done in a horizontal state of the first and second horizontal axes. In the check, it is assumed that deviations are to be attributed to cone error. The smaller the inclination error of the first and second horizontal axis, the smaller is their influence in determining cone error.

Embodiments of the invention are described below using the drawings. It is not intended to necessarily depict the embodiments to scale; rather, the drawings, where useful for explanation's sake, are made in a schematic and/or slightly distorted form. One shall thereby take into account that diverse modifications and changes pertaining to the form and detail of a design may be undertaken, without departing from the general idea of the invention. The general idea of the invention is not restricted to the exact form or detail of the preferred design shown and described below, or restricted to a subject matter that would be restricted in comparison to the subject matter claimed in the claims. In regard to provided measurement ranges, values lying within the mentioned limits shall be disclosed as limit values and be arbitrarily usable and claimable. For the sake of simplicity, the same reference signs are used below for identical or similar parts, or parts with identical or similar functions.

BRIEF DESCRIPTION OF THE DRAWINGS

FIGS. 6A, B illustrate the laser receiver, which is inclined to a direction of gravity by a first vertical angle (FIG. 6A) and a second vertical angle (FIG. 6B), in a schematic illustration; and FIGS. 7A-C illustrate the setup of an optical inclination sensor with a gas bubble (FIG. 7A), a characteristic curve that represents a zero position of the inclination sensor as a function of a temperature (FIG. 7B), and another characteristic curve that represents the temperature as a function of a bubble length of the gas bubble (FIG. 7C).

DETAILED DESCRIPTION OF THE DRAWINGS

Figure 1:
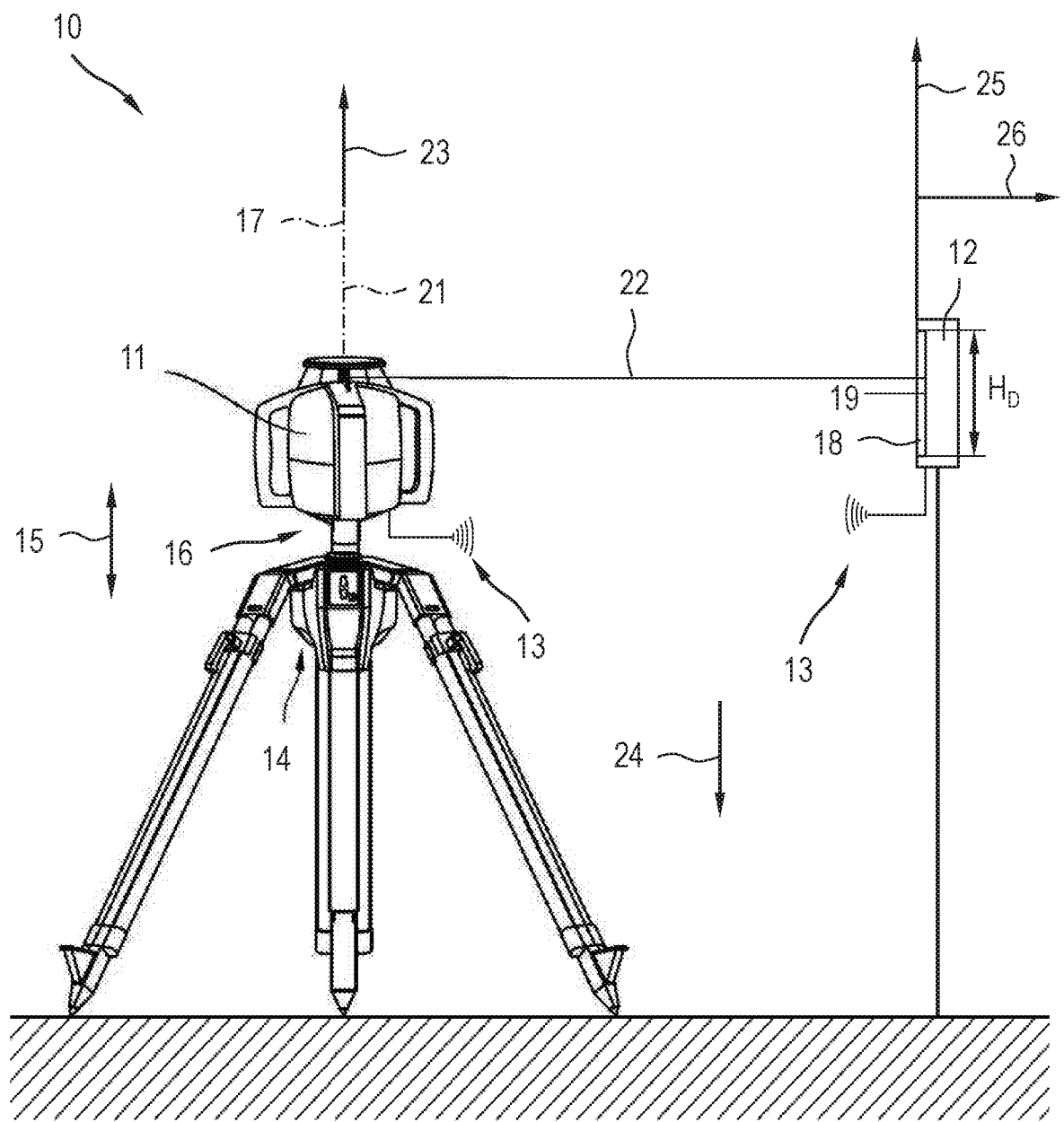
FIG. 1 illustrates a device with a rotating laser in a horizontal position and a laser receiver in a longitudinal arrangement.

FIG. 1 depicts a device 10 with a rotating laser 11 and a laser receiver 12, which can be connected via a wireless communications link 13. Rotating laser 11 is oriented in a horizontal position that is provided for horizontal applications of the rotating laser. Rotating laser 11 is arranged on a motorized tripod 14, which allows an automatic height adjustment of rotating laser 11 in a height direction 15. In addition, a rotating platform 16 may be provided, which allows an automatic angle adjustment of rotating laser 11 about an axis of rotation 17 of the rotating platform 16. Rotating platform 16 can be integrated in tripod 14 or be designed as a separate component that is arranged on tripod 14. Laser receiver 12 is provided with a measuring function, which determines an incident position of a laser beam on a detection field 18 of laser receiver 12 and represents the distance of the laser beam to a zero position 19 of detection field 18.

Rotating laser 11 is designed as a horizontally and vertically usable rotating laser, which has a first laser beam 22 rotating about an axis of rotation 21 of rotating laser 11 and a stationary second laser beam 23. Rotating first laser beam 22 produces a laser plane, which is arranged perpendicular to axis of rotation 21, and second laser beam 23 runs perpendicular to the laser plane of first laser beam 22. The horizontal position of rotating laser 11 shown in FIG. 1 utilizes first laser beam 22 and the beam is oriented at detection field 18 of laser receiver 12, wherein laser receiver 12 is oriented in a longitudinal arrangement.

The orientation of laser receiver 12 is defined by means of detection field 18 and a direction of gravity 24. Detection field 18 of laser receiver 12, with which the incident position of the first or second laser beam 22, 23 is captured, has in a longitudinal direction 25 a detection height $H_D$ and in a transverse direction 26 a detection width $B_D$, shown in FIG. 3A. Longitudinal direction 25 corresponds to the measuring direction of laser receiver 12 and transverse direction 26 is oriented perpendicular to longitudinal direction 25, wherein the longitudinal and transverse directions 25, 26 run parallel to a top side of detection field 18. The longitudinal arrangement refers to the orientation of laser receiver 12, in which the longitudinal direction 25 of detection field 18 is oriented parallel to direction of gravity 24, and the transverse arrangement refers to the orientation of laser receiver 12, in which transverse direction 26 of detection field 18 is oriented parallel to direction of gravity 24.

Figure 2A:
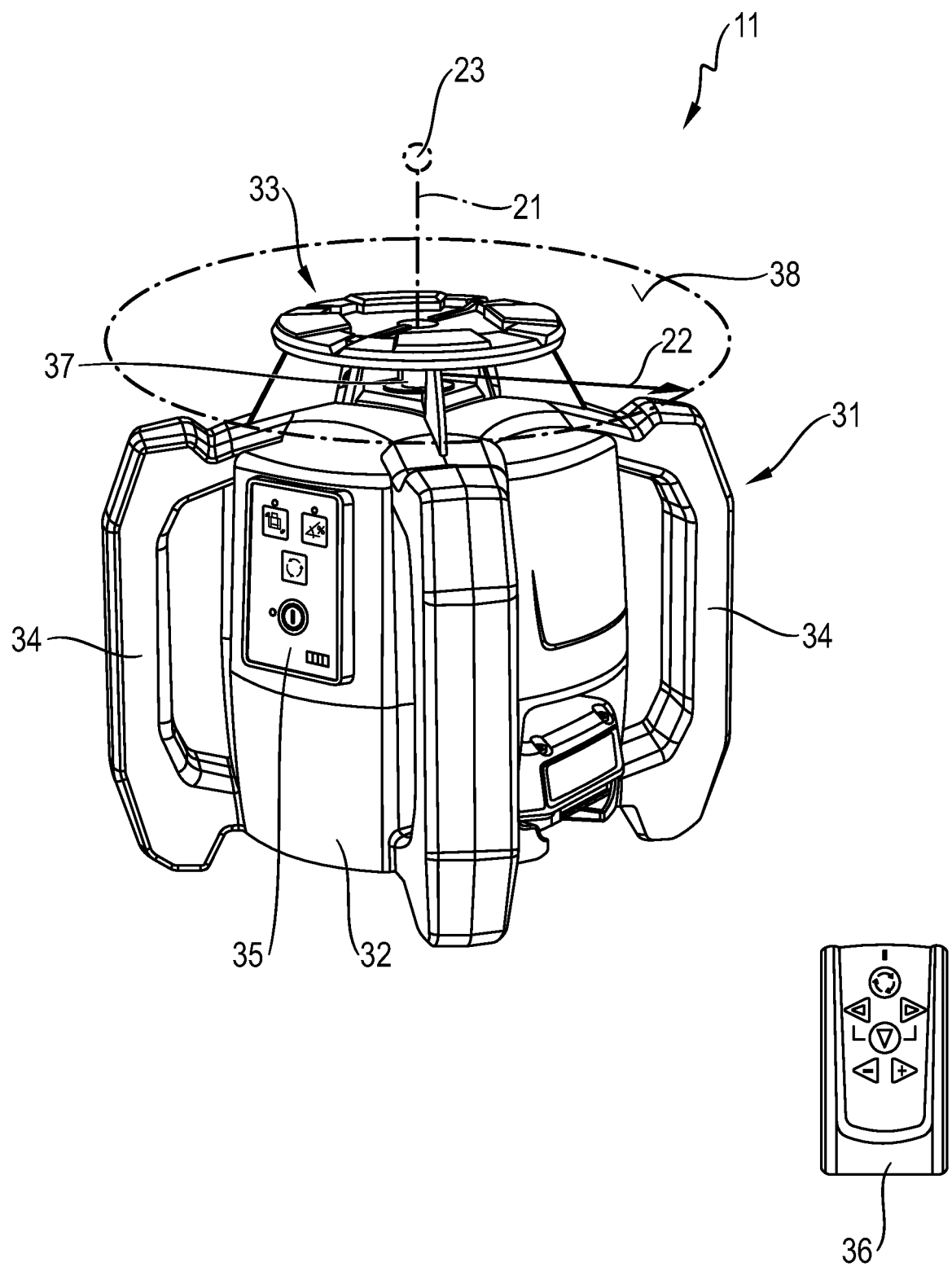
FIGS. 2A-C illustrate the rotating laser of FIG. 1 in a three-dimensional illustration (FIG. 2A) and the main components of the rotating laser in a schematic illustration in a vertical plane (FIG. 2B) and a horizontal plane (FIG. 2C)
Figure 2B:
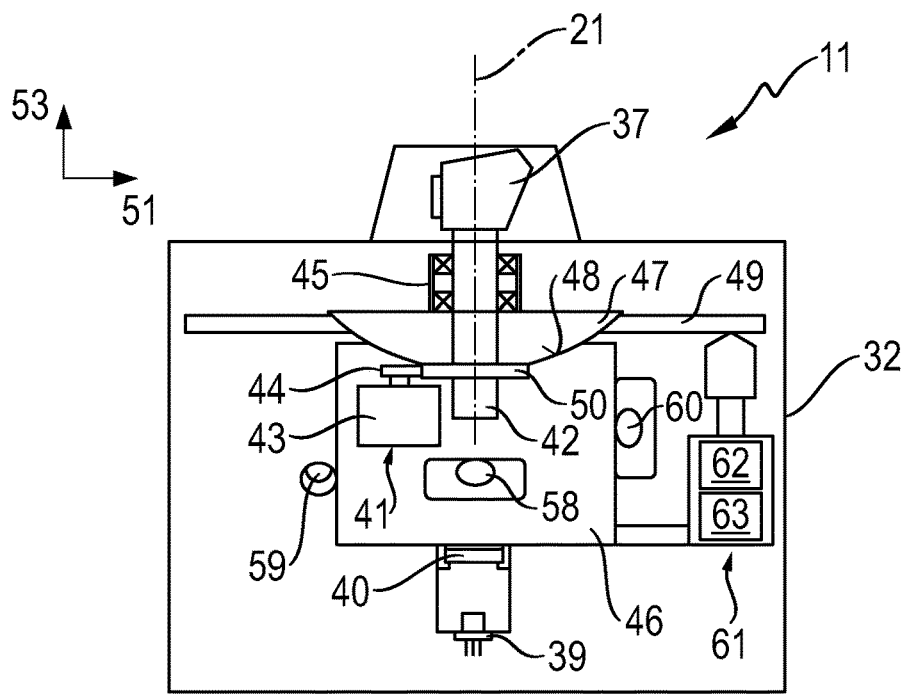
Figure 2C:
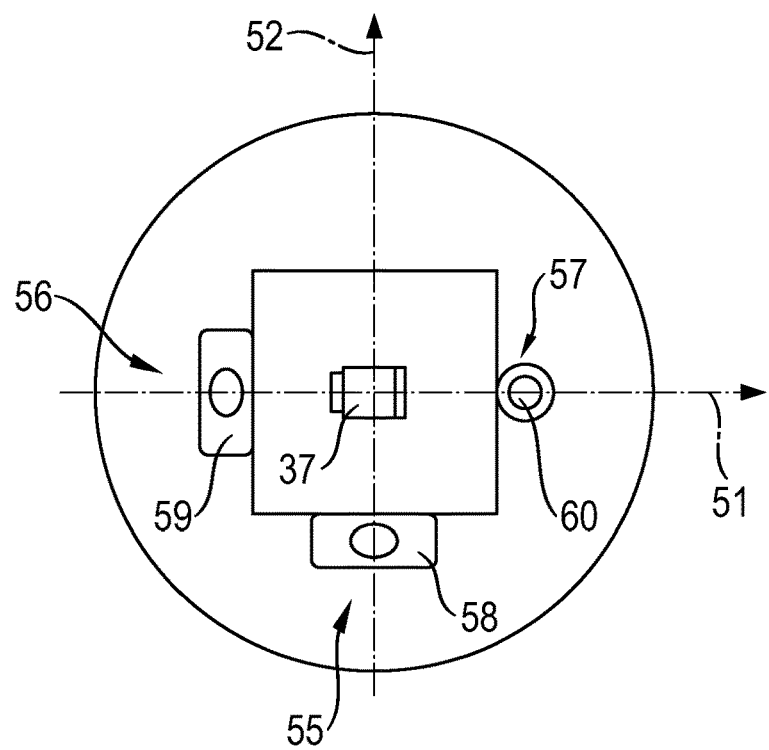

FIGS. 2A-C depict rotating laser 11 in a three-dimensional illustration (FIG. 2A) and the main components of rotating laser 11 in a schematic illustration, wherein FIG. 2B illustrates the components in a vertical plane parallel to axis of rotation 21, and FIG. 2C illustrates the components in a horizontal plane perpendicular to axis of rotation 21.

Rotating laser 11 comprises a device housing 31 and a measuring device arranged in device housing 31. Device housing 31 consists of a basic housing 32, a rotation head 33 and multiple handles 34. Rotating laser 11 is operated via an operating device 35, which is integrated in basic housing 32 and operable from the outside. Besides operating device 35 integrated in basic housing 32, a remote control 36 may be provided, which can be connected to rotating laser 11 via a communications link. The measuring device of rotating laser 11 produces within basic housing 32 a laser beam, which strikes deflection lens 37 rotating about axis of rotation 21.

A first part of the laser beam is deflected 90° by deflection lens 37 and forms first laser beam 22 of rotating laser 11, which spans a laser plane 38. A second part of the laser beam penetrates through deflection lens 37 and forms second laser beam 23 of rotating laser 11. A rotation mode, a line mode, and a point mode are differentiated depending on the rotation speed at which first laser beam 22 is rotated about rotation axis 21.

FIGS. 2B, C depict the main components of rotating laser 11 in a schematic illustration. Rotating laser 11 comprises a laser device with a beam source 39, which produces a laser beam, and collimation lens 40. Beam source 39 is designed as a semiconductor laser for example, which produces the laser beam in the visible wavelength spectrum, for example a red laser beam having a wavelength of 635 nm or a green laser beam having a wavelength of 532 nm. After the laser beam leaves beam source 39, the laser beam is collimated using the collimation lens 40. Alternatively, the collimation lens may be integrated in the beam source, or for a beam source 39 having a high beam-quality and little divergence, the collimation lens may be omitted.

The collimated laser beam strikes deflection lens 37, which separates the first and second laser beams 22, 23. Deflection lens 37 is connected to a rotation device 41, which moves deflection lens 37 about axis of rotation 21. Rotation device 41 comprises a rotatable shaft 42, a motor unit 43, and a transmission device 44, which is designed in the form of a toothed belt and transmits the movement of motor unit 43 to shaft 42. Deflection lens 37 is coupled to rotatable shaft 42 and is designed to be rotatable about axis of rotation 21. Shaft 42 is seated in a pivot bearing 45 of a stator element 46, which is connected to a spherical cap 47. Spherical cap 47 is seated in a manner where it can be inclined about two pivot planes perpendicular to two rotation planes (plane perpendicular to axis of rotation 21) in a spherical cap 48 bearing 48 in a housing-fitted installation frame 49. Rotating laser 11 comprises a measuring device 50, which measures the angle of rotation of shaft 42 during the rotation about axis of rotation 21. Measuring device 50 is designed, for example, as an angle encoder and consists of a graduated wheel that is non-rotatably connected to shaft 42, a scanning device with which the measuring disk is scanned, and an evaluation and control element.

Rotating laser 11 is designed as a horizontally and vertically usable rotating laser, wherein a horizontally and vertically usable rotating laser differs from a horizontally usable rotating laser due to an additional device axis. Rotating laser 11 has as device axes a first horizontal axis Si and a second horizontal axis 52, which run vertically to each other and span a device plane. The first and second horizontal axes 51, 52 arc displayed on rotation head 33 of rotating laser 11 via display elements. The horizontally and vertically usable rotating laser 11 has, besides the first and second horizontal axes 51, 52, an additional device axis, which is referred to as vertical axis 53 and is ideally oriented perpendicular to the device plane of the first and second horizontal axes 51, 52.

Rotating laser 11 is designed as a self-leveling rotating laser, which levels itself automatically when device housing 31 of rotating laser 11 is set up within a self-leveling range. The self-leveling range of rotating lasers is typically 5°. Rotating laser 11 comprises a leveling device, which orients the device axes of rotating laser 11 independently of an orientation of device housing 31 in a defined state. The leveling device comprises a first leveling unit 55 that orients first horizontal axis 51 in a first defined state, a second leveling unit 56 that orients second horizontal axis 52 in a second defined state, and a third leveling unit 57 that orients vertical axis 53 in a third defined state.

First leveling unit 55 comprises a first inclination sensor 58 and a first adjustment element, second leveling unit 56 comprises a second inclination sensor 59 and a second adjustment element, and third leveling unit 57 comprises a third inclination sensor 60 and a third adjustment element. The adjustment elements of leveling units 55, 56, 57 are integrated in inclination device 61, which has a first adjustment motor 62 and a second adjustment motor 63. First adjustment motor 62 inclines mounting frame 49 about a first pivot axis, which coincides with second horizontal axis 52, and the second adjustment motor 63 inclines mounting frame 49 about a second pivot axis, which coincides with first horizontal axis 51. First adjustment motor 62 forms the first adjustment element of first leveling unit 55 and second adjustment motor 63 forms the second adjustment element of second leveling unit 56. Since vertical axis 53 is oriented perpendicular to the horizontal plane of first and second horizontal axes 51, 52, the orientation of vertical axis 53 can be adjusted by means of first and second adjustment motors 62, 63. First and second adjustment motors 62, 63 jointly form the third adjustment element of third leveling unit 57.

The horizontal orientation of the laser plane or the device plane represents a preferred defined state, in which a rotating laser 11 is to be oriented in a horizontal position, wherein the horizontally oriented device plane is also referred to as a horizontal plane. The vertical orientation of the laser plane or the device plane represents a preferred defined state, in which a rotating laser 11 is to be oriented in a vertical position, wherein the vertically oriented device plane is also referred to as a vertical plane. Laser plane 38, which produces rotating first laser beam 22, can be inclined by means of inclination device 61 in relation to the horizontal plane or the vertical plane of rotating laser 11. Rotating laser 11 can incline the laser plane of rotating first laser beam 22 in an inclination direction or in two inclination directions. The inclination of the laser plane occurs in a leveled stated of rotating laser 11. Rotating laser 11 can be inclined in a horizontal position or in a vertical position.

Figure 3A:
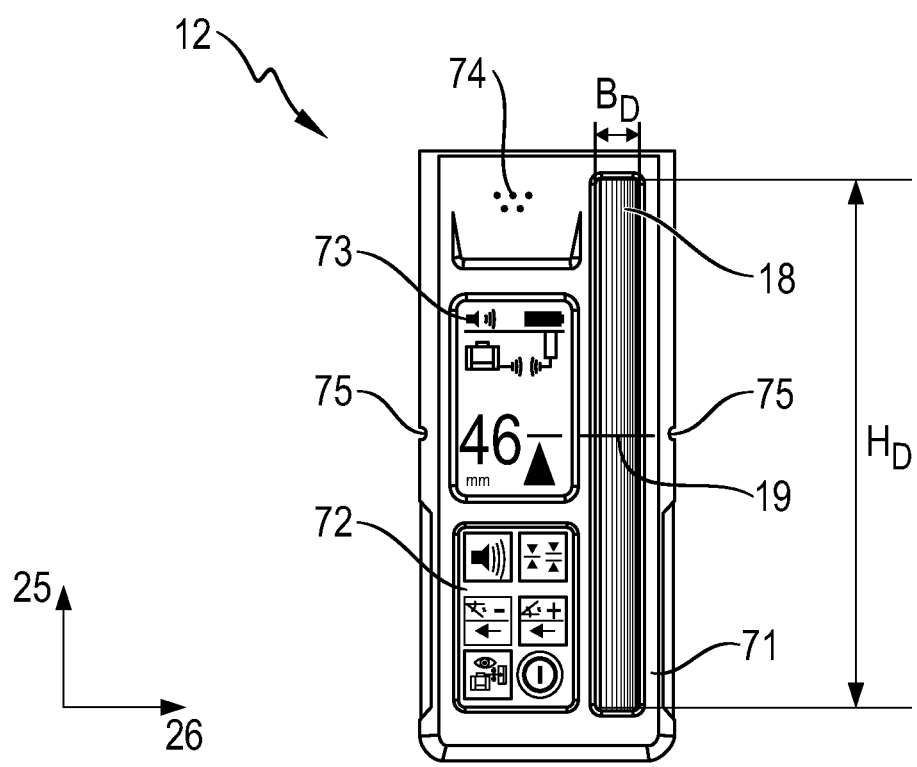
FIGS. 3A, B illustrate the laser receiver of FIG. 1 in a three-dimensional illustration (FIG. 3A) and the main components of the laser receiver and the rotating laser in a schematic illustration (FIG. 3B)
Figure 3B:
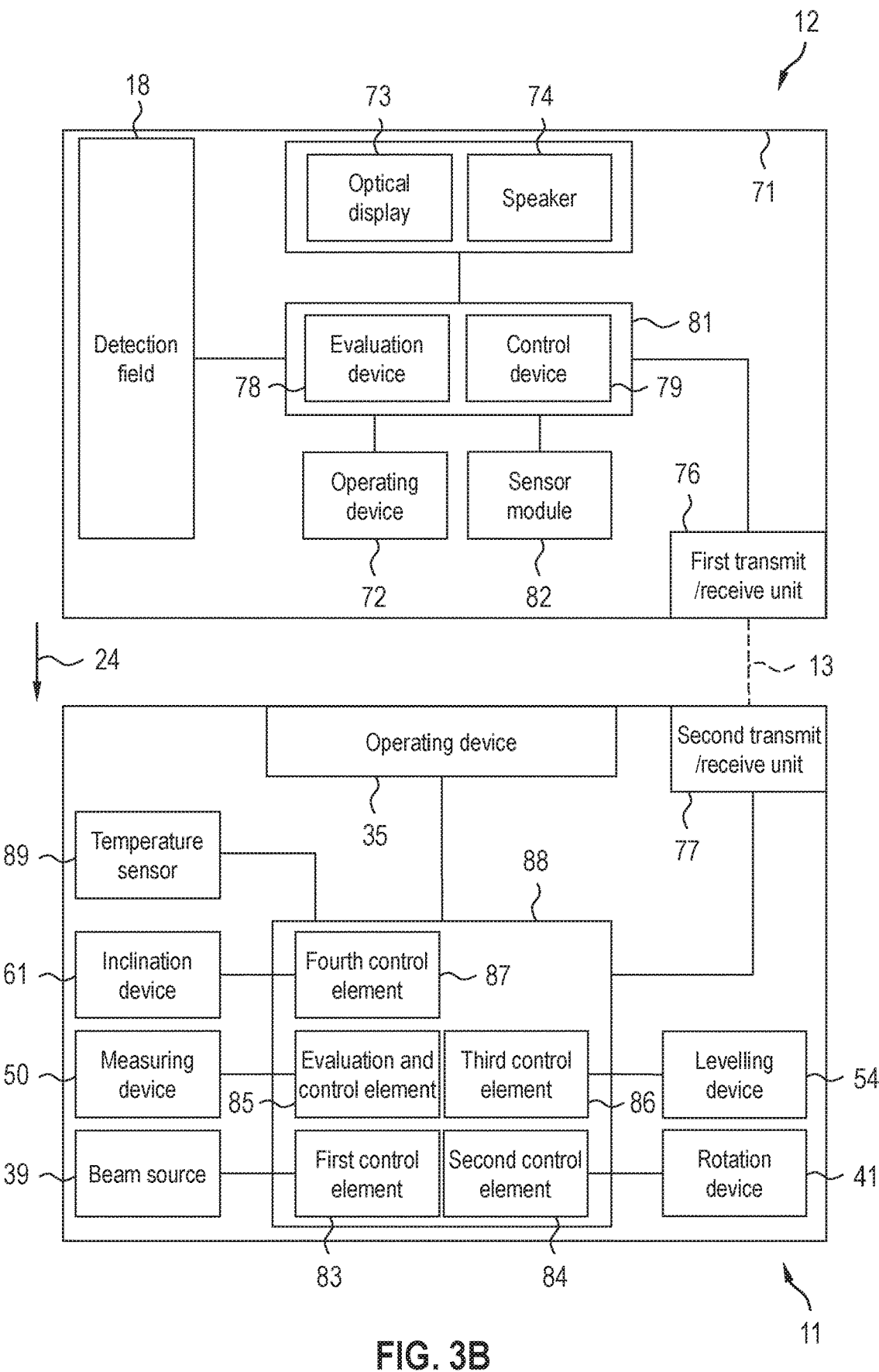

FIGS. 3A, B depict laser receiver 12 in a three-dimensional illustration (FIG. 3A) and the main components of laser receiver 12 as well as the interaction with rotating laser 11 in a schematic illustration (FIG. 3B). Laser receiver 12 is provided with a measuring function, which determines the distance of a laser beam to zero position 19 of detection field 18.

Laser receiver 12 comprises a receiver housing 71, an operating device 72, an optic display 73, a speaker 74 and detection field 18, with which the incident position of a laser beam is captured. Detection field 18 has detection height $H_D$ in longitudinal direction 25 and detection width $B_D$ in transverse direction 26. Longitudinal direction 25 corresponds to the measuring direction of laser receiver 12 and transverse direction 26 is oriented perpendicular to longitudinal direction 25, wherein the longitudinal and transverse directions 25, 26 run parallel to detection field 18.

Operating device 72, optical display 73, speaker 74 and detection field 18 are integrated in receiver housing 71 of laser receiver 12. The operator can read information about laser receiver 12 via optical display 73. The information includes for example a charge state of laser receiver 12, information about wireless communications link 13 to a rotating laser 11, and the adjusted volume of speaker 74. In addition, the distance of a laser beam to zero position 19 of laser receiver 12 can be indicated as a numerical value. As an alternative or in addition to the optical indication on optic display 73, the distance of the laser beam can be conveyed via speaker 74. Zero position 19 of detection field 18 is indicated on receiver housing 71 via marking notches 75.

FIG. 3B depicts the main components of laser receiver 12 and the interaction of laser receiver 12 with rotating laser 11 in the form of a block diagram. Communication between laser receiver 12 and rotating laser 11 occurs via communications link 13, which connects a first transmit/receive unit 76 in laser receiver 12 with a second transmit/receive unit 77 in rotating laser 11. First and second transmit/receive units 76, 77 are designed for example as radio modules and the communication between laser receiver 12 and rotating laser 11 occurs via a communications link 13 designed as a radio link.

Detection field 18, optical display 73 and speaker 74 are connected to an evaluation device 78, which is arranged inside receiver housing 71. Evaluation device 78 is connected to a control device 79 to control laser receiver 12, wherein evaluation device 78 and control device 79 are integrated in a control device 81 designed for example as a microcontroller. Laser receiver 12 also comprises a sensor module 82, which is arranged inside receiver housing 71 and is connected to control device 81. Using sensor module 82, an inclination of laser receiver 12 relative to direction of gravity 24 can be measured. Sensor module 82 comprises a 2-axis acceleration sensor or two 1-axle acceleration sensors.

The components of rotating laser 11, which are controlled by means of control elements or are connected to an evaluation element, include beam source 39, rotation device 41, measuring device 50 as well as leveling device 54, and if on hand inclination device 61. A first control element 83 for controlling beam source 39, a second control element 84 for controlling rotation device 41, an evaluation and control element 85 for measuring device 50, a third control element 86 for controlling leveling device 54 and a fourth control element 87 for controlling inclination device 61 can be designed as separate components, or as illustrated in FIG. 3B they can be integrated in a common control device 88, which is designed as a microcontroller for example. The control elements are connected via communication links to the components to be controlled of rotating laser 11.

Rotating laser 11 also comprises a temperature sensor 89, which is arranged in device housing 31 of rotating laser 11. Temperature sensor 89 measures the temperature in device housing 31 and transmits the temperature to control device 89 of rotating laser 11. Since the orientation of inclination sensors 58, 59, which orient first and second horizontal axes 51, 52 of rotating laser 11 in the horizontal state, are temperature-dependent and rotating laser 11 can be utilized in a large temperature range, for example between −20° C. and +50° C., it is advantageous if multiple zero positions v are stored in control device 88 of rotating laser 11. To do so, multiple first zero positions $v_1$ can be entered for first inclination sensor 58 as a function of the temperature and stored in a characteristic curve or table, multiple second zero positions $v_2$ can be entered for second inclination sensor 59 as a function of the temperature and stored in a characteristic curve or table, and multiple third zero positions $v_3$ can be entered for third inclination sensor 60 as a function of the temperature and stored in a characteristic curve or table. The zero position associated with the measured temperature is read from the characteristic curve or table, and the horizontal axis is oriented in the horizontal state defined by the zero position.

Figure 4A:
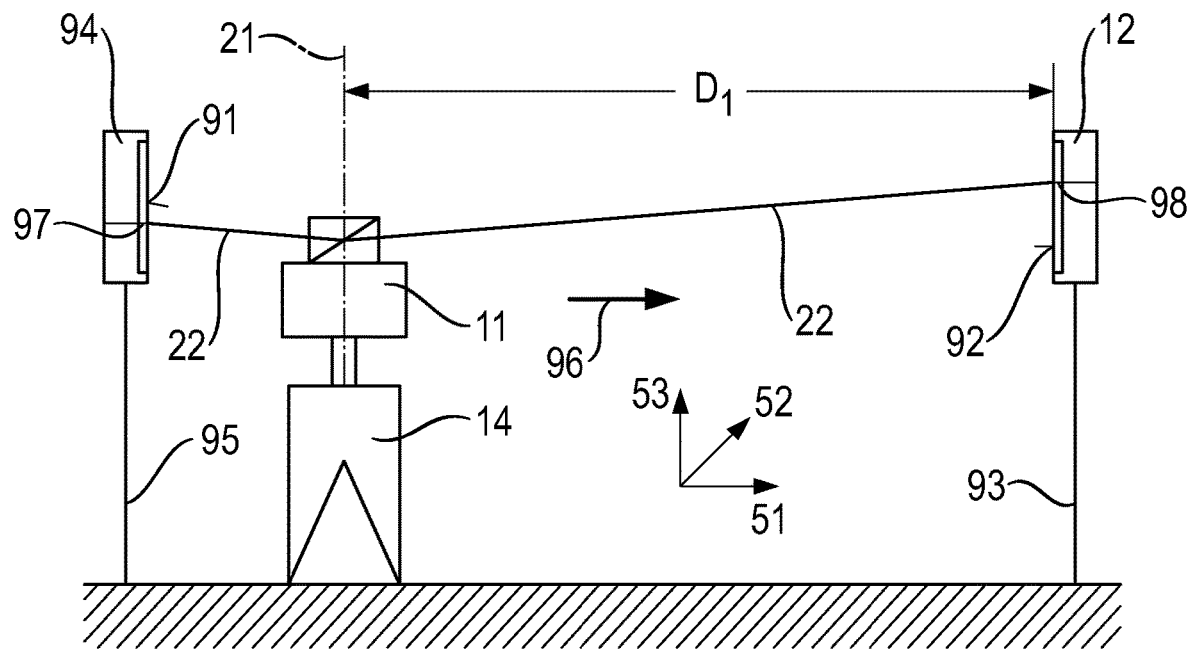
FIGS. 4A-C illustrate the rotating laser and the laser receiver of FIG. 1 executing the method according to the invention for checking a rotating laser for cone error.
Figure 4B:
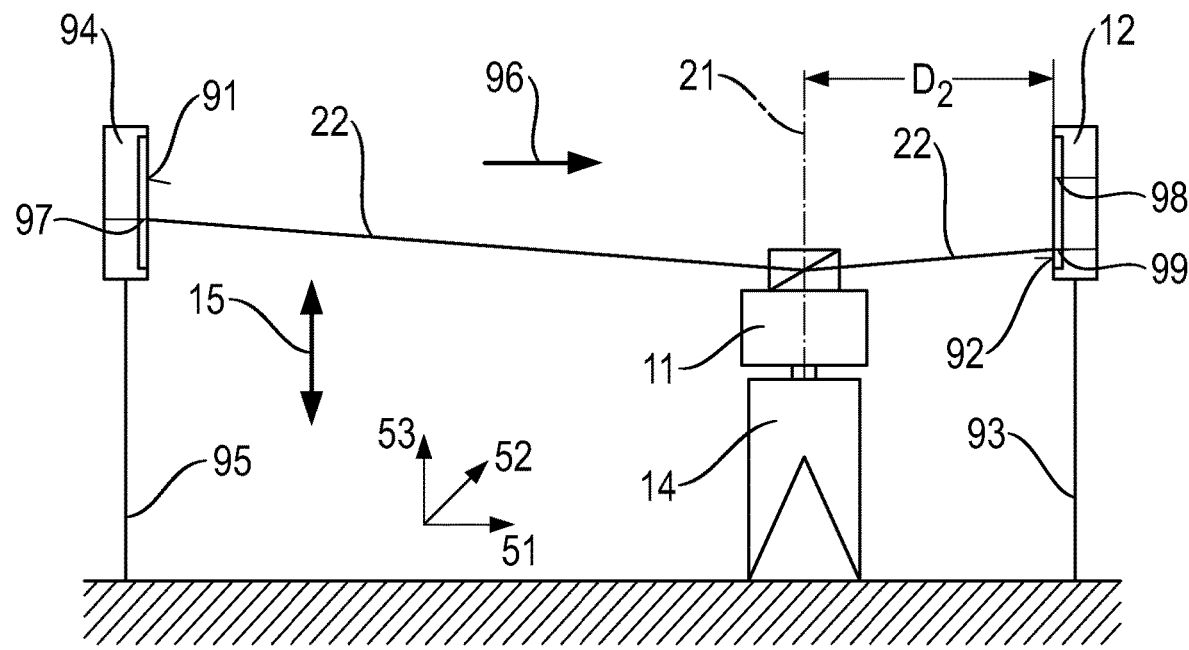
Figure 4C:
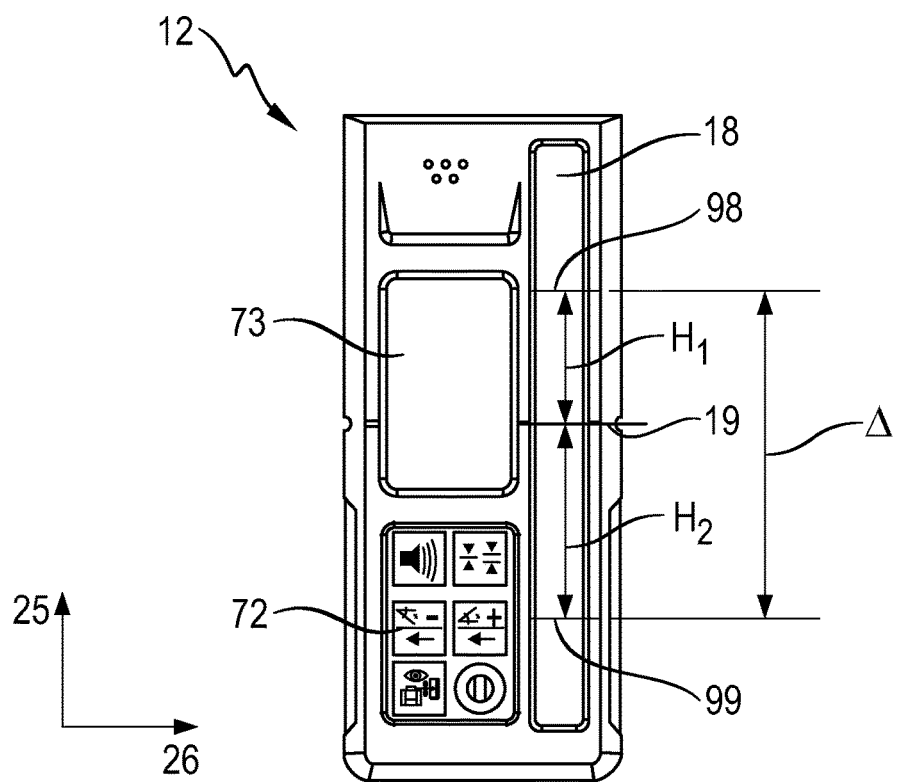

FIGS. 4A-C depict device 10 of FIG. 1 with rotating laser 11 and laser receiver 12 while executing the method according to the invention for checking rotating laser 11 for cone error. FIG. 4A depicts rotating laser 11 in a first location, in which rotating laser 11 has a first measurement distance D1 to laser receiver 12, FIG. 4B depicts rotating laser 11 in a second location in which rotating laser 11 has a second measurement distance D2 to laser receiver 12, and FIG. 4C depicts laser receiver 12 with the incident positions of rotating first laser beam 22 on detection field 18 in the first and second locations.

The method according to the invention for checking rotating laser 11 for cone error is executed in a horizontal position of rotating laser 11 and in the longitudinal arrangement of laser receiver 12. Rotating laser 11 is set up in a horizontal position on tripod 14 or on a stable substrate. Using tripod 14 has the advantage that the method according to the invention is executed at a height at which temperature fluctuations are less than on the ground. In addition, tripod 14 allows for an automatic height adjustment of rotating laser 11 by means of height adjustment device 16.

To adjust the horizontal position of rotating laser 11, first and second horizontal axis 51, 52 are oriented in a horizontal state, wherein the horizontal state of first horizontal axis 51 is established by a first zero position v1 of first inclination sensor 58 and the horizontal state of second horizontal axis 52 is established by second zero position v2 of second inclination sensor 5. First horizontal axis 51 is oriented by means of first leveling unit 55 in first zero position v1 and second horizontal axis 52 is oriented by means of second leveling unit 56 in second zero position v2. Stored in control device 89 of rotating laser 11 are first zero position v1 for first inclination sensor 58 and second zero position v2 for second inclination sensor 59.

Checking rotating laser 11 for cone error is executed between a first measurement surface 91 and a second measurement surface 92. The first and second measurement surfaces are used to determine the incident positions of the laser beam. Laser receiver 12 is attached to a measuring staff 93 and comprises second measurement surface 92. In the embodiment, first measurement surface 91 is integrated in an additional laser receiver 94, which is attached to an additional measuring staff 95. Additional laser receiver 94 corresponds in its setup to laser receiver 12 and is provided with a measuring function.

Rotating laser 11 is arranged sequentially in the first and second locations. In the first location, rotating laser 11 is set up at first measurement distance D1 to second measurement surface 92, and first horizontal axis 51 is oriented toward second measurement surface 92. Alternatively, second horizontal axis 52 of rotating laser 11 or any axis in the horizontal plane can be oriented toward second measurement surface 92. The axis, which is oriented in the first location toward second measurement surface 92, is referred to as measuring direction 96, in the second location, rotating laser 11 is set up at second measurement distance D2 to second measurement surface 92 and measurement distance 96 is oriented toward second measurement surface 92. First and second measurement distances D1, D2 are measured between axis of rotation 21 of rotating laser 11 and the front side of detection field 18, which forms second measurement surface 92. In the embodiment of FIGS. 4A-C, first horizontal axis 51 of rotating laser 11 in the first and second location is oriented toward second measurement surface 92.

In the first location, laser beam 22 rotates about axis of rotation 21 and strikes first measurement surface 91 and second measurement surface 92. The incident position of rotating laser beam 22 on first measurement surface 91 is determined by the evaluation device of the additional laser receiver 94 as first control point 97. The incident position of rotating laser beam 21 on second measurement surface 92 is determined by evaluation device 78 of laser receiver 12 as second control point 98 and the distance of second control point 98 to zero position 19 of detection field 18 is stored as first height offset H1. Rotating laser 11 is moved out of the first location into the second location (FIG. 4B). In the second location, laser beam 22 rotates about axis of rotation 21 and strikes first measurement surface 91 and second measurement surface 92. Rotating laser 11 is moved by means of the height adjustment device of tripod 14 in height direction 15 until the incident position of laser beam 22 on first measurement surface 91 matches first control point 97. The incident position of rotating laser beam 22 on second measurement surface 92 is determined by evaluation device 78 of laser receiver 12 as third control point 99 and the distance of third control point 99 to zero position 19 of detection field 18 is stored as second height offset H2.

Evaluation device 78 of laser receiver 12 calculates the distance between second control point 98 and third control point 99 as difference Δ from first and second height offsets H1, H2 (FIG. 4C). As described, the evaluation can be performed by evaluation device 78 of laser receiver 12. Alternatively, the evaluation can be performed by a corresponding component in rotating laser 11 or an additional component, if the evaluation is not performed by evaluation device 78 of laser receiver 12, the second and third control points 98, 99 or difference Δ are conveyed via a communications link to the corresponding component. Evaluation device 78 of laser receiver 12 calculates cone error δ from the difference Δ=H1−H2 of first measurement distance D1 and second measurement distance D2 between rotating laser 11 and laser receiver 12, and compares cone error δ against an established maximum error δmax. Cone error δ can be calculated according to the formula $\tan(\delta)=\frac{1}{2}(H1-H2)/(D1-D2)$. If cone error δ is greater than maximum error δflax, an adjustment of rotating laser 11 is required.

The first and second measurement distances D1, D2 between rotating laser 11 and laser receiver 12 are determined in a first and/or second measuring procedure by means of rotating laser 11 and laser receiver 12. First measurement distance D1 between rotating laser 11 and laser receiver 12 is determined in the first location, and second measurement distance D2 between rotating laser 11 and laser receiver 12 is determined in the second location. They can determine the measurement distances D1, D2 as first distance d1 by means of a first measuring procedure, as second distance d2 by means of a second measuring procedure or as distance d averaged from first and second distances d1, d2. First and second distances d1, d2 are thereby determined in a horizontal position of rotating laser 11 and longitudinal arrangement of laser receiver 12.

In the second measuring procedure, rotating laser 11 is operated in a rotating mode and rotating first laser beam 22 is moved at a constant rotation speed vR about axis of rotation 21. The second measuring procedure comprises the method steps: Rotating laser 11 is oriented horizontally and first laser beam 22 is rotated at constant rotation speed vR about axis of rotation 21. Evaluation device 78 of laser receiver 12 determines a signal length ts of rotating first laser beam 22 on detection field 18 of laser receiver 12. Second distance d2 can be calculated from rotation speed vR of first laser beam 22, signal length ts of first laser beam 22 and detection width BD of detection field 18 according to $ts/tfull=BD/(2\pi d2)$ where $tfull=60/vR$. Rotation speed vR is provided in revolutions per minute and time tfull required for one revolution is 60/vR.

Figure 5A:
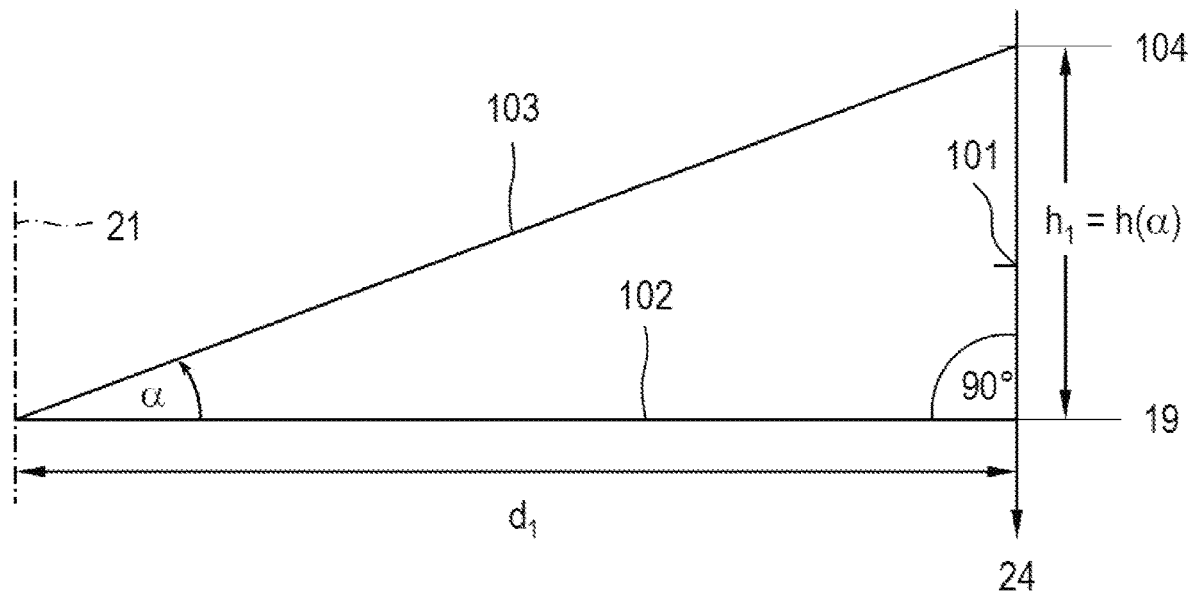
FIGS. 5A-C illustrate three variants of a first measuring procedure for measuring a first distance between the rotating laser and the laser receiver by means of an inclined laser beam.
Figure 5B:
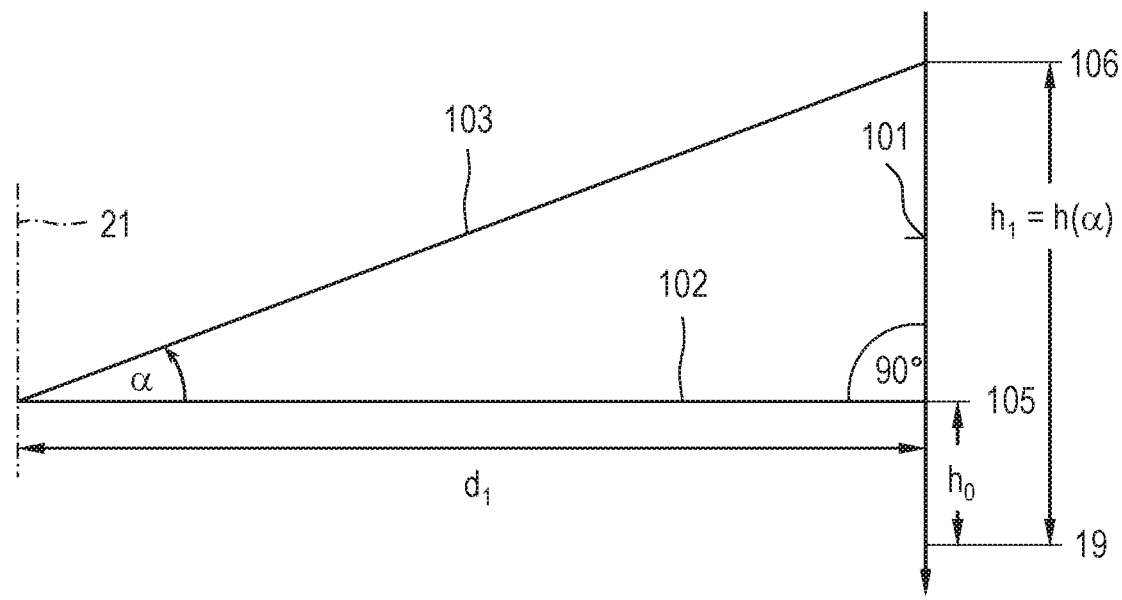
Figure 5C:
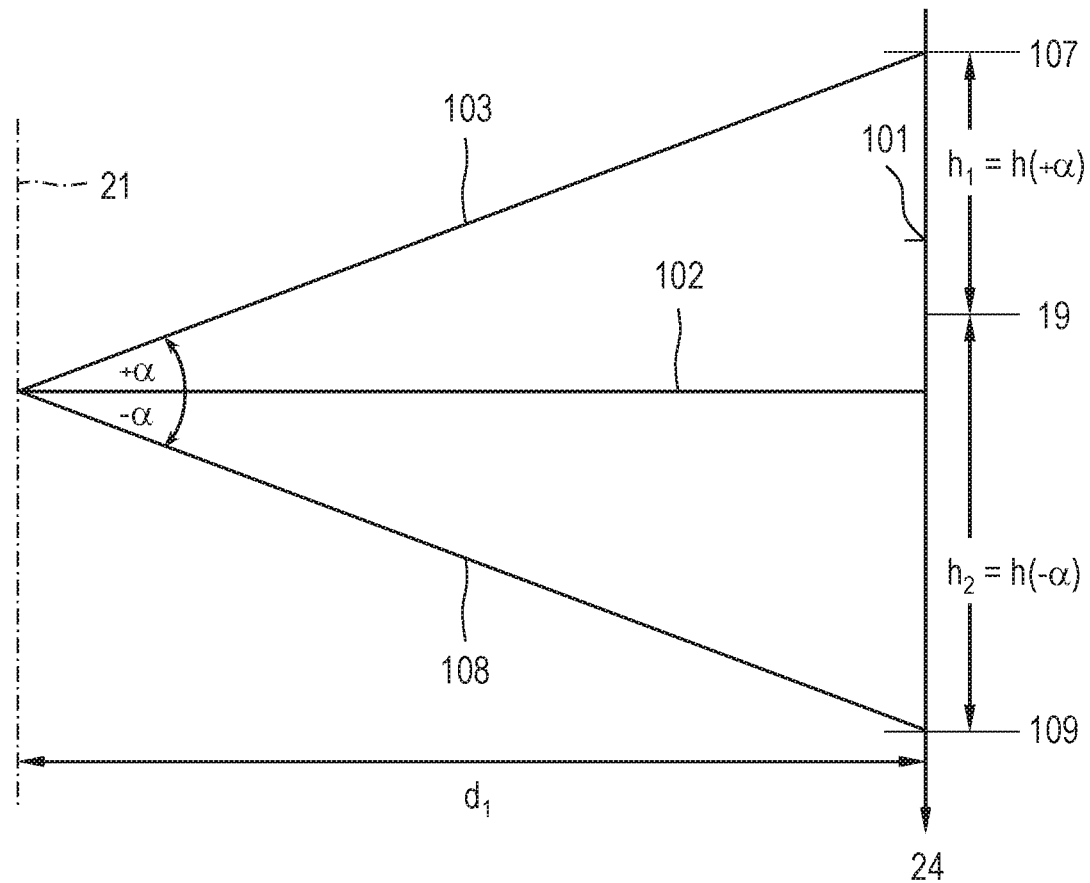

FIGS. 5A-C depict three variants of the first measuring procedure, with which the measurement distance between rotating laser 11 and laser receiver 12 is determined as first distance d1. The first measuring procedure is applied in the first location to determine first measurement distance D1 between rotating laser 11 and laser receiver 12, and in the second location to determine measurement distance D2 between rotating laser 11 and laser receiver 12.

Laser receiver 12 is oriented parallel to direction of gravity 24 and first distance d1 is measured between axis of rotation 21 of rotating laser 11 and a front side 101 of detection field 18 of laser receiver 12. At the start of the first measuring procedure, horizontal axes 51, 52 of rotating laser 11 are in a horizontal state or are oriented into a horizontal state. Rotating laser 11 projects a horizontally oriented laser beam 102.

In the first measuring procedure, rotating laser 11 is operated in a point mode and the laser beam is not moved about axis of rotation 21. The laser beam is inclined by a known inclination angle α and the incident position of the inclined laser beam on detection field 18 of laser beam 12 is determined as a measuring point and the height offset of the measuring point is stored as a height. The laser beam can thereby be inclined using leveling device 54 or inclination device 61. The use of leveling device 54 has the advantage that measurement distance D can also be determined by rotating lasers 11 without an inclination device 61. The first measuring procedure requires that rotating laser 11 is oriented to laser receiver 12 in such a manner that the inclination direction runs approximately perpendicular to detection field 18 of laser receiver 12. Deviations from the perpendicular orientation result in measurement errors that are tolerable for small deviations.

Rotating laser 11 is oriented in the first and second location in measurement direction 96 toward the second measurement surface, wherein first horizontal axis 51, second horizontal axis 52, or any axis in the horizontal plane can be defined as measurement direction 96. If first or second horizontal axis 51, 52 is used as measuring direction 96, rotating laser 11 is arranged for distance measurement in a suitable angular position. The inclination of laser beam 102 thereby occurs by means of the leveling unit 55 when first horizontal axis 51 is used as measuring direction 96, and by means of second leveling unit 56 when second horizontal axis 52 is used as measuring direction 96. If any axis in the horizontal plane is used as measuring direction 96, rotating laser 11 must be adjusted for the distance measurement in a corresponding angular position (first or second horizontal axis 51, 52).

FIG. 5A depicts the first variant of the first measuring procedure. Horizontally oriented laser beam 102 is adjusted to zero position 19 of laser receiver 12. Laser beam 102 can be oriented to zero position 19 by means of a height-adjustable tripod, for example. For a fully automated design, a tripod is suitable with a so-called "auto-alignment" function, as it is described in EP 1 203 930 B1. The laser beam is then inclined using the corresponding leveling unit of leveling device 54 or inclination device 61 by inclination angle α. The incident position of inclined laser beam 103 on detection field 18 of laser receiver 12 is determined as first measuring point 104 and the distance of first measuring point 104 to zero position 19 is stored as first height $h1=h(\alpha)$. First distance d1 can be calculated from inclination angle α and a height difference Δh between the first height ($h1=h(\alpha)$) and zero position 19 of detection field 18. When zero position 19 corresponds to a height of 0 mm, first distance d1 can be calculated according to $\tan(\alpha)=h(\alpha)/d1$.

FIG. 5B depicts the second variant of the first measuring procedure. Horizontally oriented laser beam 102 is projected to detection field 18 of laser receiver 12. The incident position of laser beam 102 on detection field 18 is determined as reference point 105 and the distance of reference point 105 to zero position 19 is stored as reference height $h0=h(0°)$. The laser beam is then inclined by inclination angle α and the incident position of inclined laser beam 103 on detection field 18 is determined as first measuring point 106 and the distance of first measuring point 106 to zero position 19 is stored as first height h1=h(α). First distance d1 can be calculated from inclination angle α and the height difference Δh between the first height h1=h(α) and the reference height h0=h(0°) according to tan(α)=(h1−h0)/d1.

FIG. 5C depicts the third variant of the first measuring procedure. The horizontally oriented laser beam 102 is inclined in a positive inclination direction by inclination angle α. The incident position of inclined laser beam 103 on detection field 18 is determined as first measuring point 107 and the distance of first measuring point 107 to zero position 19 is stored as first height h1=h(+α). Subsequently, the laser beam is inclined to a negative inclination direction, opposite the positive inclination direction, by a negative inclination angle −α. The incident position of inclined laser beam 108 on detection field 18 is determined as second measuring point 109 and the distance of second measuring point 109 to zero position 19 is stored as second height h2=h(−α). First distance d1 can be calculated from inclination angle α and height difference Δh between first height h1=h(+α) and second height h2=h(−α) according to tan(2α)=(h(+α)−h(−α))/d1.

The formulas to calculate measurement distance D, between rotating laser 11 and laser receiver 12 and the formulas to calculate correction angle θ when calibrating vertical axis 53 apply to a laser receiver 12, which is oriented parallel to direction of gravity 24. To correct measuring errors due to a non-plumb orientation of laser receiver 12, laser receiver 12 comprises sensor module 82, with which the inclination of laser receiver 12 is measured relative to direction of gravity 24.

FIGS. 6A, B depict the orientation of laser receiver 12 in a schematic illustration, wherein laser receiver 12 may be inclined to direction of gravity 24 by a first vertical angle $\varphi_1$ and/or a second vertical angle $\varphi_2$. FIG. 6A thereby depicts laser receiver 12, which is inclined in a first vertical plane by first vertical angle $\varphi_1$, and FIG. 6B depicts laser receiver 12, which is inclined in a second vertical plane by a second vertical angle $\varphi_2$. The first vertical plane is spanned by direction of gravity 24 and a perpendicular vector 110 of detection field 18, and the second vertical plane is spanned by longitudinal direction 25 and transverse direction 26 of detection field 18. First vertical angle $\varphi_1$ is measured between perpendicular vector 110 and direction of gravity 24, wherein first vertical angle $\varphi_1$ represents a deviation of 90° between perpendicular vector 110 and direction of gravity 24, and second vertical angle $\varphi_2$ is measured between direction of gravity 24 and longitudinal direction 25 of detection field 18.

A first laser beam strikes detection field 18 of laser receiver 12 and produces a first incident position 111. A second laser beam strikes detection field 18 of laser receiver 12 and produces a second incident position 112. Evaluation device 78 of laser receiver 12 calculates a distance ΔI between first incident position 111 and second incident position 112. In the method for checking a rotating laser for cone error, distance ΔI corresponds to difference Δ from first height offset H1 and second height offset H2, and in the distance measurement using the first measuring procedure, distance ΔI corresponds to height difference Δh.

If laser receiver 12 is inclined by first vertical angle $\varphi_1$ in relation to direction of gravity 24, vertical distance v1 in direction of gravity 24 in the first vertical plane is smaller than distance ΔI, which detection field 18 of laser receiver 12 measured (FIG. 6A). For vertical distance v1, the correlation is ΔI* cos($\varphi_1$). If laser receiver 12 is inclined by second vertical angle $\varphi_2$ in relation direction of gravity 24, vertical distance v2 in direction of gravity 24 in the second vertical plane is smaller than distance ΔI, which detection field 18 of laser receiver 12 measured (FIG. 6B). For vertical distance v2, the correlation is ΔI*cos($\varphi_2$). When laser receiver 12 is inclined in relation to direction of gravity 24 by first vertical angle $\varphi_1$ and second vertical angle $\varphi_2$, the correlation for the vertical distance in direction of gravity 24 is ΔI* cos($\varphi_1$)*cos($\varphi_2$). In the formulas that use the measuring function of laser receiver 12 and measure distances ΔI on detection field 18, the distances ΔI are multiplied by a correction factor cos($\varphi_1$)*cos($\varphi_2$). The correction factor cos($\varphi_1$)*cos($\varphi_2$) is to be taken into account in the distance measurement of first and second measurement distances D1, D2 using the first measuring procedure and when determining difference Δ between second and third control points 98, 99.

Second vertical angle $\varphi_2$ should also be taken into account in the distance measurement using the second measuring procedure. By inclining laser receiver 12 by second vertical angle $\varphi_2$, the horizontal distance vertical to direction of gravity 24, which rotating first laser beam 22 passes over on detection field 18, is greater than detection width BD of detection field 18 in transverse direction 26. The signal length of rotating first laser beam 22 corresponds to the horizontal distance on detection field 18. For the horizontal distance, the correlation is BD/cos($\varphi_2$). An inclination of laser receiver 12 by first vertical angle $\varphi_1$ does not change the horizontal distance, which rotating first laser beam 22 passes over on detection field 18.

Figure 7B:
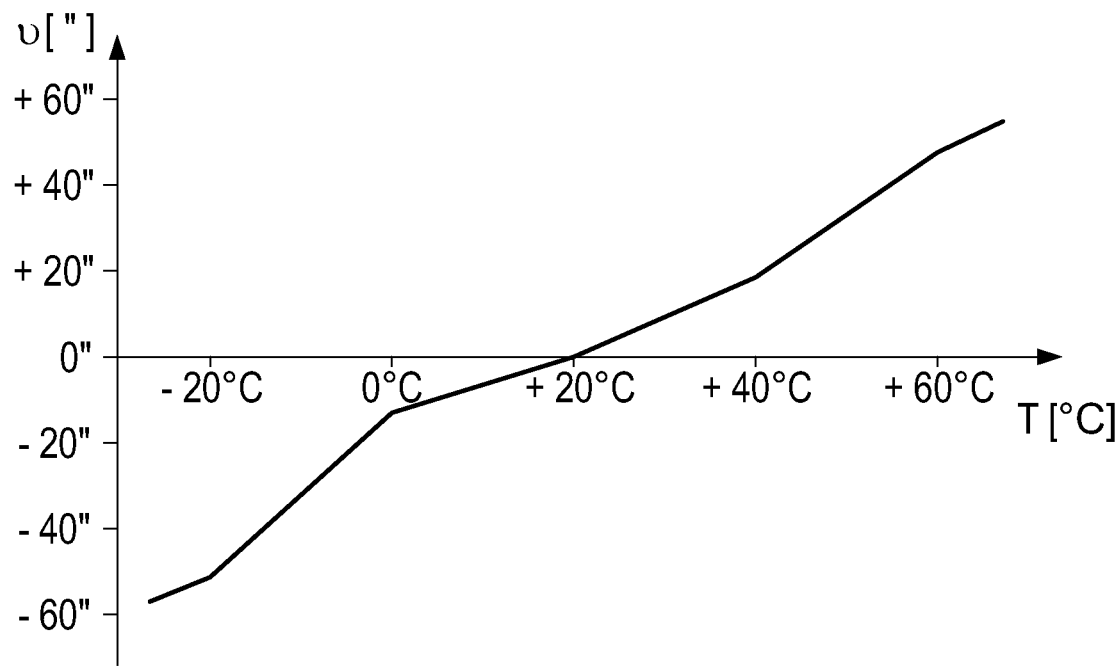
Figure 7C:
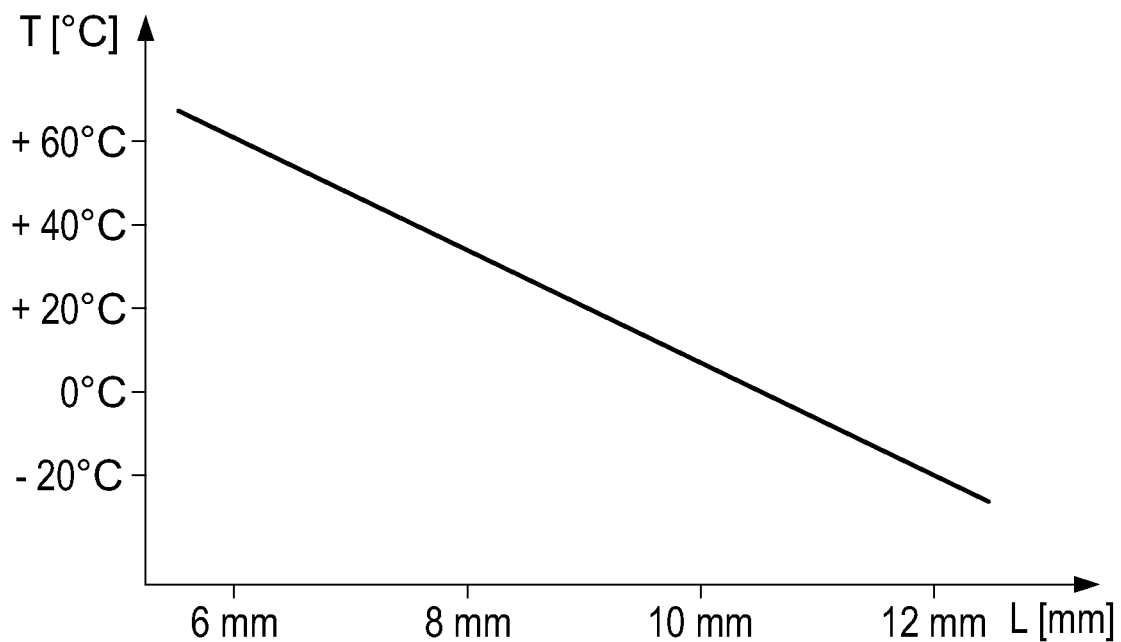

FIGS. 7A-C depict the setup of an optical inclination sensor 115 having a gas bubble 116 (FIG. 7A), a characteristic curve that represents the zero position v of inclination sensor 115 as a function of a temperature T (FIG. 7B), and another characteristic curve that represents temperature T as a function of a bubble length L of gas bubble 116 (FIG. 7C).

For outdoor applications of rotating laser 11, sunrays may result in temperature fluctuations in device housing 31 of rotating laser 11, so that the measured temperature depends on the position of temperature sensor 89 in device housing 31. To reduce measurement errors in the temperature measurement, the temperatures of inclination sensors 58, 59 can be measured. The temperature of first inclination sensor 58 is referred to as first temperature T1 and the temperature of second inclination sensor 59 as second temperature T2. The temperature measurement is taken using inclination sensors 58, 59. The temperature measurement using inclination sensors 58, 59 has the advantage that temperatures T1, T2 are measured exactly at the location in device housing 31, which is relevant for the orientation of first and second horizontal axes 51, 52.

FIG. 7A depicts the components of inclination sensor 115, whose structure corresponds to inclination sensors 58, 59 of rotating laser 11. Inclination sensor 115 comprises a housing 117, which is filled with gas bubble 116 and a liquid 118, a light source 119, a photo detector 120, and a spacer 121. Gas bubble 116 has a bubble length L, which is temperature-dependent and thus suitable as a measurement variable for temperature T. Bubble length L of gas bubble 116 can be measured using light source 119 and photo detector 120. To differentiate between the first and second inclination sensors 58, 59, the components are provided with an index, which is separated by a hyphen from the reference sign. First inclination sensor 58 has index "1" and second inclination sensor 59 has index "2."

FIG. 7B depicts a characteristic curve that represents zero position v of inclination sensor 115 as a function of temperature T. For the approved temperature range of rotating laser 11 from −20° C. to +50° C., the characteristic curve produces a relationship between the temperature of inclination sensor 115 and zero position v of inclination sensor 115, which corresponds to the orientation in the defined state of inclination sensor 115. In control device 89 of rotating laser 11, there is stored a first characteristic curve representing first zero position v1 of first inclination sensor 58 as a function of first temperature T1 and a second characteristic curve representing second zero position v2 of second inclination sensor 59 as a function of second temperature T2.

FIG. 7C depicts another characteristic curve, which represents temperature T as a function of bubble length L of gas bubble 116. For the approved temperature range of rotating laser 11 from −20° C. to +50° C., the characteristic curve produces a relationship between temperature T of inclination sensor 115 and bubble length L of gas bubble 116. Bubble length L of gas bubble 116 changes linearly with temperature T of inclination sensor 115, wherein bubble length L decreases as temperature T drops. In control device 89 of rotating laser 11, there is stored an additional first characteristic curve representing first temperature T1 as a function of first bubble length L1 of first gas bubble 116-1, and an additional second characteristic curve representing second temperature T2 as a function of second bubble length L2 of second gas bubble 116-2.

Alternatively, the characteristic curve, which represents zero position v of inclination sensor 115 as a function of temperature T, can be replaced by a characteristic curve that represents zero position v of inclination sensor 115 as a function of bubble length L of gas bubble 116. In this case, there is stored in control device 89 of rotating laser 11 a first characteristic curve that represents first zero position v1 of first inclination sensor 58 as a function of first bubble length L1 of first gas bubble 116-1, and a second characteristic curve representing second bubble length v2 of second inclination sensor 59 as a function of second bubble length L2 of second gas bubble 116-2.

The invention claimed is:

1. A method for checking a rotating laser (11) for a cone error, wherein the rotating laser (11) projects a first rotating laser beam (22) rotatable about an axis of rotation (21) in a horizontal plane and wherein the horizontal plane is spanned by a first (51) and a second (52) horizontal axis, comprising the steps of:

setting up the rotating laser in a first location between a first measurement surface (91) and a second measurement surface (92), wherein the rotating laser (11) in the first location has a first measurement distance (D1) to the second measurement surface (92) and is oriented in a measuring direction (96) toward the second measurement surface (92);

orienting the first and second horizontal axes (51, 52) of the rotating laser (11) in a horizontal state, wherein the horizontal state of the horizontal axes (51, 52) is established by a first zero position (v1) for the first horizontal axis (51) and a second zero position (v2) for the second horizontal axis (52);

determining an incident position of the laser beam (22) on the first measurement surface (91) as a first control point (97);

determining an incident position of the laser beam (22) on the second measurement surface (92) by a detection field (18) of a laser receiver (12) as a second control point (98) and storing a distance of the second control point (98) to a zero position (19) of the detection field (18) as a first height offset (H1);

setting up the rotating laser (11) in a second location between the first measurement surface (91) and the second measurement surface (92), wherein the rotating laser (11) in the second location has a second measurement distance (D2) to the second measurement surface (92) and is oriented in the measuring direction (96) toward the second measurement surface (92);

arranging the rotating laser (11) at a height at which the incident position of the laser beam (22) on the first measurement surface (91) matches the first control point (97);

determining an incident position of the laser beam (22) on the second measurement surface (92) by the detection field (18) of the laser receiver (12) as a third control point (99) and storing a distance of the third control point (99) to the zero position (19) of the detection field (18) as a second height offset (H2);

calculating a distance between the second control point (97) and the third control point (98) as a difference (Δ) from the first and the second height offsets (H1, H2);

calculating the cone error (δ) from the first measurement distance (D1), the second measurement distance (D2), and the difference (Δ); and comparing the cone error (6) against a maximum error (δmax).

2. The method according to claim 1, wherein the incident position of the laser beam (22) on the first measurement surface (91) in the first location is determined by an additional laser receiver (94).

3. The method according to claim 2, wherein the rotating laser is arranged on a tripod and the arranging at the height of the rotating laser (11) in the second location occurs in a manner controlled by a height adjustment device of the tripod.

4. The method according to claim 1, wherein the first measurement distance (D1) in the first location and/or the second measurement distance (D2) in the second location are determined by the rotating laser (11) and the laser receiver (12).

5. The method according to claim 4, wherein the first and/or the second measurement distance (D1, D2) is determined as a first distance (d1) by a first measuring procedure, as a second distance (d2) by a second measuring procedure, or as a distance (d) averaged from the first and the second distances (d1, d2).

6. The method according to claim 5, wherein the rotating laser is oriented horizontally, a horizontally oriented laser beam (102) is adjusted to the zero position (19) of the detection field (18), the horizontally oriented laser beam is inclined in a direction of the laser receiver (12) at an inclination angle (a), an incident position of the inclined laser beam (103) on the detection field (18) of the laser receiver (12) is determined as a first measuring point (104), a distance of the first measuring point (104) to the zero position (19) of the detection field (18) is stored as a first height (h1=h(α)), and the first distance (d1) is calculated from the inclination angle (α) and a height difference (Δh) between the first height (h1=h(α)) and the zero position (19) of the detection field (18).

7. The method according to claim 5, wherein the rotating laser (11) is oriented horizontally, an incident position of a horizontally oriented laser beam (102) on the detection field (18) of the laser receiver (12) is determined as a reference point (105), a distance of the reference point (105) to the zero position (19) of the detection field (18) is stored as a reference height (h0), the horizontally oriented laser beam is inclined at an inclination angle (a), an incident position of the inclined laser beam (103) on the detection field (18) is determined as a first measuring point (106), a distance of the first measuring point (106) to the zero position (19) of the detection field (18) is stored as first height (h1=h(α)), and the first distance (d1) is calculated from the inclination angle (α) and a height difference (Δh=h1−h0) between the first height (h1) and the reference height (h0).

8. The method according to claim 5, wherein the rotating laser (11) is oriented horizontally, a horizontally oriented laser beam (102) is inclined in an inclination direction at an inclination angle (α), an incident position of the inclined laser beam (103) on the detection field (18) of the laser receiver (12) is determined as a first measurement point (107), a distance of the first measurement point (107) to the zero position (19) of the detection field (18) is stored as a first height (h1=h(α)), the horizontally oriented laser beam is inclined in an opposite inclination direction by a negative inclination angle (−α), an incident position of the oppositely inclined laser beam (108) on the detection field (18) is determined as a second measurement point (109), a distance of the second measurement point (109) to the zero position (19) of the detection field is stored as a second height (h2=h(−α)), and the first distance (d1) is calculated from the inclination angle (α) and a height difference (Δh=h1−h2) between the first height (h1) and the second height (h2).

9. The method according to claim 5, wherein the rotating laser (11) is oriented horizontally, a horizontally oriented laser beam (102) is rotated at a rotation speed (vR) about the axis of rotation (21), a signal length (ts) of the rotating laser beam is determined on the detection field (18) of the laser receiver (12), and the second distance (d2) is calculated from the rotation speed (vR), the signal length (ts), and a detection width (BD) of the detection field (18).

10. The method according to claim 1, wherein an inclination of the laser receiver (12) relative to a direction of gravity (24) is determined as a first vertical angle (φ1) in a first vertical plane and/or as a second vertical angle (φ2) in a second vertical plane, wherein the first vertical plane is spanned by the direction of gravity (24) and a perpendicular vector (110) of the detection field (18) of the laser receiver (12), and wherein the second vertical plane is spanned by a longitudinal direction (25) and a transverse direction (26) of the detection field (18).

11. The method according to claim 10, wherein the first vertical angle (φ1) and/or the second vertical angle (φ2) is multiplied by an angle-dependent correction factor (cos(φ1), cos(φ2), 1/cos(φ2)).

12. The method according to claim 1, wherein for the orienting of the first and the second horizontal axes (51, 52) in the horizontal state, multiple first and second zero positions (v1, v2) are recorded as a function of a temperature (T) or a measured value (L) dependent on the temperature (T) and stored in a first and a second characteristic curve.

13. The method according to claim 12, wherein a temperature (T) or a measured value (L) of the rotating laser (11) is measured, zero positions (v1, v2) associated with the temperature (T) or the measured value (L) of the rotating laser (11) are determined from the characteristic curves, and the horizontal axes (51, 52) are oriented in the horizontal state defined by the zero positions (v1, v2).

* * * * *